Patented Oct. 11, 1927.

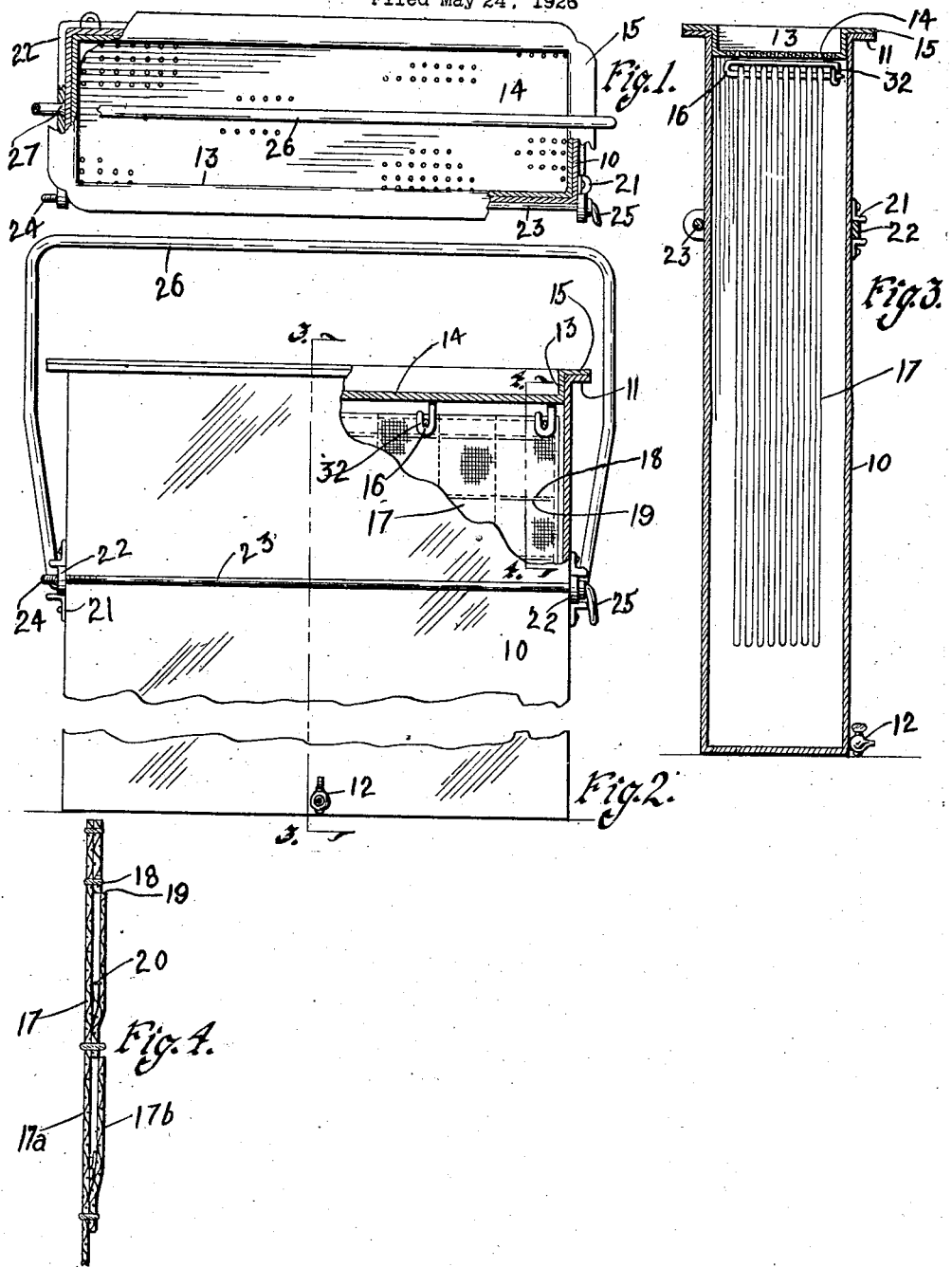

1,644,895

UNITED STATES PATENT OFFICE.

THOMAS MILES ROBERTS, OF VILLISCA, IOWA.

SEED CORN TESTER.

Application filed May 24, 1926. Serial No. 111,266.

The object of my invention is to provide a seed corn tester of simple, durable and inexpensive construction.

Further and more particular objects of my invention are to provide a seed corn tester having a casing with a top closure member in the form of a pan for holding water and provided with a perforated bottom having means for detachably supporting a series of absorbent members having pockets.

Still another object is to provide in such a structure a detachable handle.

With these and other objects in view, my invention consists in the construction, arrangement and combination of the various parts of my seed corn tester, whereby the objects contemplated are attained, as hereinafter more fully set forth, pointed out in my claims, and illustrated in the accompanying drawings, in which:

Figure 1 is a top or plan view of my improved seed corn tester, parts being broken away and parts being shown in section.

Figure 2 is a side elevation of the same, parts being broken away and parts being shown in section.

Figure 3 is a detail, sectional view taken on the line 3—3 of Figure 2; and

Figure 4 is a detail, sectional view of one of the absorbent devices having the pockets.

In the drawings herewith, I have used the reference numeral 10 to indicate the container or casing forming a part of my seed corn tester. The casing is open at its upper end, and is provided at its top with a peripheral horizontal flange extending outwardly, as at 11. The casing is provided at the bottom with a pet cock 12.

I provide a top or closure member for the casing, comprising a pan 13 having a perforated bottom 14 and the peripheral, outwardly extending flange 15, at its upper edge. Secured to the under side of the bottom 14 of the pan 13 is a series of supporting devices 16, having substantially the form of large safety pins. These supporting devices 16 have mounted on them a series of absorbent blankets or the like 17, which I will call the seed holders.

Each seed holder comprises two strips 17ª and 17ᵇ of absorbent material. The two strips 17ª and 17ᵇ of each seed holder 17 are sewed together by vertical and horizontal rows of stitches 18, which are so arranged as to divide the seed holder into squares. The member 17ᵇ is provided with a horizontal slit 19 at the top of each square for thus forming a pocket having an open upper end through which access may be had to its interior.

The seed corn or the like 20 is placed in the pockets.

In the actual use of the device, I place in each pocket one or more grains of corn from an ear. The cover member 13 is then put in position and water is poured into it. The water passes down through the perforations in the bottom 14 and is largely absorbed by the seed corn holders 17.

The device is then kept under proper temperature conditions for a suitable length of time, and then the seed may be examined for determining which ears would make good seed corn.

When the device is filled with corn and the holders are thoroughly dampened, it will be seen that the tester is quite heavy. It is therefore desirable that means be provided for conveniently moving it from place to place. It is also desirable that the handle or other means for transporting the device from place to place should be removable.

I therefore provide near the top of the device a series of horizontally aligned lugs 21. These lugs are arranged in pairs, the members of which are vertically spaced.

For a handle, I provide a yoke 22, which is somewhat resilient and extends around one side and two ends of the casing 10 and projects beyond the ends of the casing 10 slightly at the free ends of the arms of said yoke. The projecting ends of the yoke receive a rod 23, one end of which is screw-threaded, as at 24, to cooperate with screw-threads in the appropriate projecting end of the yoke 22. The other end of the rod 23 is bent at right angles to the main body of the rod, as at 25, to serve as a handle for screwing the rod into place.

I provide a bail 26, the ends of which are in-turned as at 27 (Figure 1) and are rotatably mounted in the yoke 22.

By means of the bail 26, which serves as a handle, the seed corn tester may be conveniently moved from place to place.

It should perhaps be mentioned that extending downwardly from the bottom 14 are rows of hooks 32, which hold the supporting devices 16, as shown in Figures 2 and 3.

It will be seen that I have provided a comparatively simple seed corn tester, which can be readily and easily transported from place to place. It will hold a comparatively large amount of seed corn in a comparatively small space. It can be easily manipulated for the purposes desired.

When the user wishes to examine the seed corn, the pan member 13 is simply removed and the seed corn holder 17 laid flat. The seed corn in each pocket of the upper holder may be examined, and that holder may then be folded over out of the way or may be entirely removed from the holder devices 16, if desired.

Some changes may be made in the details of the construction and arrangement of the parts of my improved seed corn tester, and it is my intention to cover by the claims of the patent to be issued upon my application, any modified forms of structure or use of mechanical equivalents, which may be reasonably included within their scope.

I claim as my invention:

1. In a device of the class described, a casing open at its upper end, a closure member for said upper end comprising a pan with a perforated bottom, a series of supporting devices on the under side of said pan, a series of seed corn holders comprising strips of absorbent material provided with pockets, said supporting devices being adapted to support the seed corn holders.

2. In a device of the class described, a casing open at its upper end, a closure member for said upper end comprising a pan with a perforated bottom, a series of supporting devices on the under side of said pan, a series of seed corn holders comprising strips of absorbent material provided with pockets, said supporting devices being adapted to detachably support said holders.

THOMAS MILES ROBERTS.